United States Patent [19]
Schwind

[11] 3,709,036
[45] Jan. 9, 1973

[54] FLUID TURBULENCE STUDY APPARATUS AND METHOD

[75] Inventor: Richard G. Schwind, LaHonda, Calif.

[73] Assignee: Nielsen Engineering and Research Corporation

[22] Filed: Aug. 31, 1970

[21] Appl. No.: 68,310

[52] U.S. Cl. ................................................. 73/147
[51] Int. Cl. ............................................. G01m 9/00
[58] Field of Search ....73/147, 148; 46/77; 272/31 A

[56] References Cited

UNITED STATES PATENTS

| | | | |
|---|---|---|---|
| 1,039,889 | 10/1912 | Brianne | 73/147 |
| 2,448,966 | 9/1948 | Fales | 73/147 |
| 3,476,386 | 11/1969 | Bart | 272/31 A |

*Primary Examiner*—James J. Gill
*Attorney*—Limbach, Limbach & Sutton

[57] ABSTRACT

A rotating arm carrying vortex generators generates outwardly spiralling vortices in a fluid-medium. Measurements are made in the fluid disturbances caused by the vortices.

15 Claims, 9 Drawing Figures

FIG_1
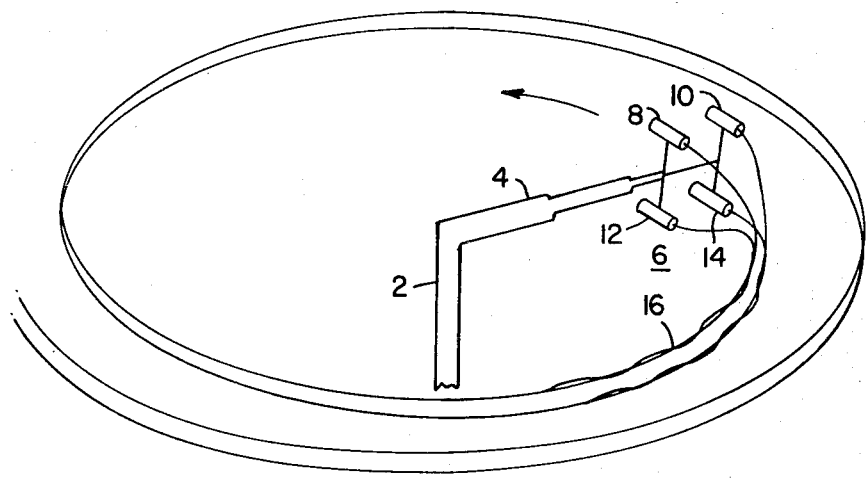
FIG_2
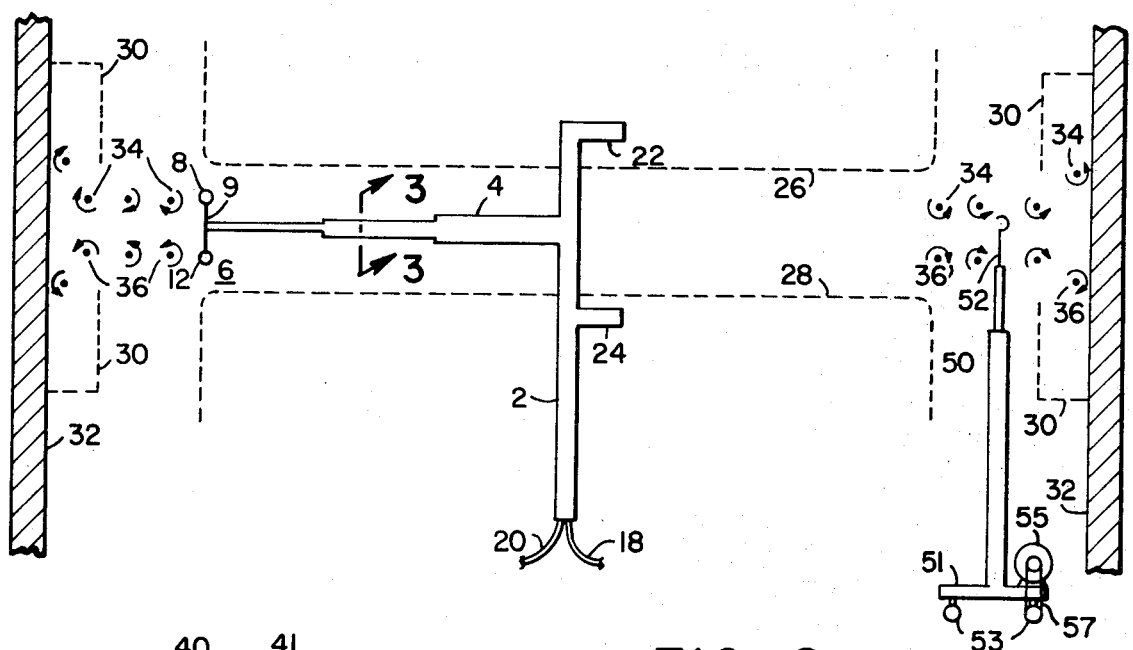
FIG_3
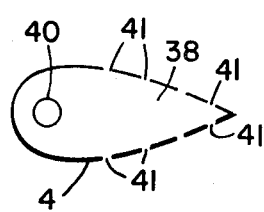
INVENTOR.
RICHARD G. SCHWIND
BY
Lindbach, Lindbach & Sutton
ATTORNEYS

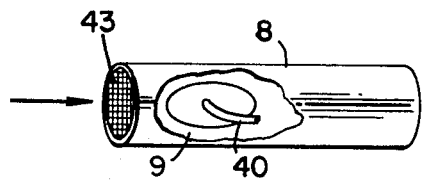
FIG_4
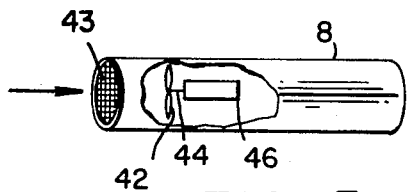
FIG_5
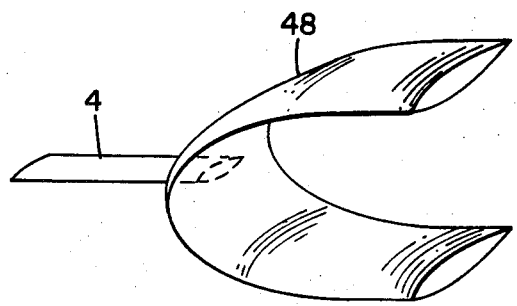
FIG_6
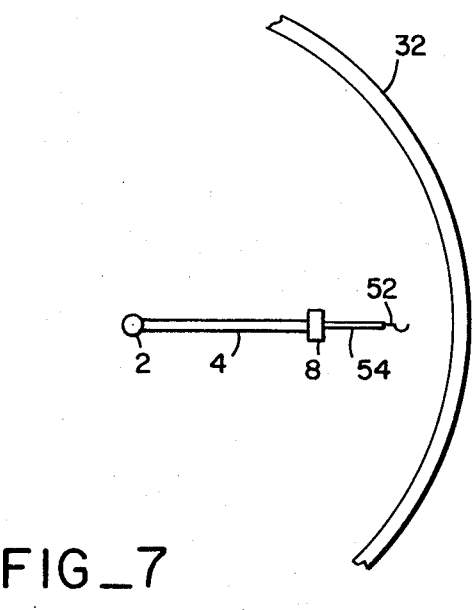
FIG_7
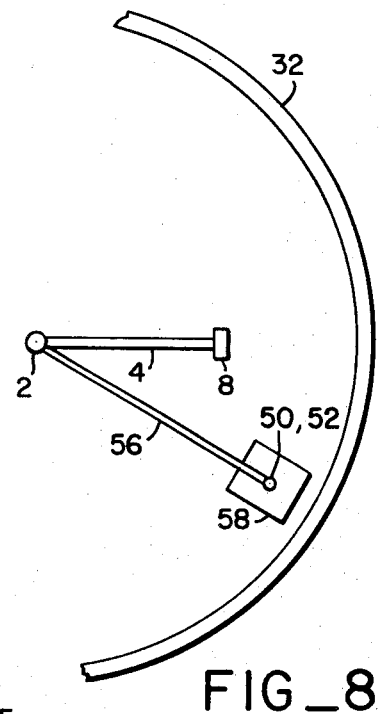
FIG_8
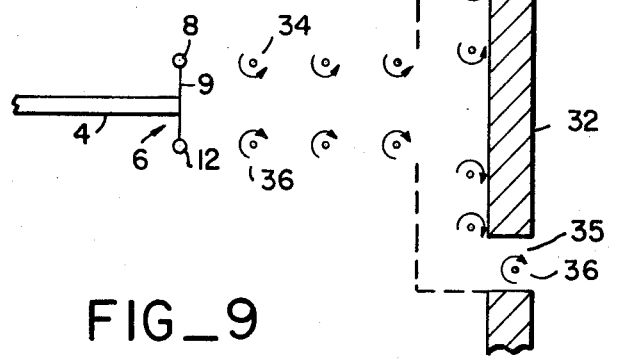
FIG_9
INVENTOR.
RICHARD G. SCHWIND
BY
Limbach, Limbach & Sutton
ATTORNEYS

FLUID TURBULENCE STUDY APPARATUS AND METHOD

BACKGROUND OF THE INVENTION

This invention relates generally to an apparatus and method for fluid turbulence studies and more particularly to an apparatus and method for studying the trailing vortex phenomenon by generating spiral trails.

The vortices that trail off the wing tips of an aircraft cause its wake to persist and be dangerous to other airplanes that pass through it several minutes later. Present testing methods for obtaining data of the vortex persistency consist of probing the wake with another aircraft or taking measurement in a scaled-down wind-tunnel experiment. In the former case, it is very difficult to find the vortex center and obtain meaningful measurements. For the latter type of experiment, existing wind tunnels do not have nearly as long or as large a test section as is needed to measure their persistency and decay. The vortices are inclined at an angle to the main flow and soon approach too closely to one of the wind-tunnel walls, so either this effect or the test section length limits how much of the trailing vortices can be studied.

The recent introduction of markedly larger aircraft has reemphasized the problem of the persistency of aircraft trailing vortices. Extensive study is in process at various laboratories. Because of the turbulent nature of the vortices, theoretical methods are based on empirical turbulent transport information obtained from well-controlled model testing. However, wind tunnel measurements of a single trailing vortex are available only for relatively short distances downstream of their point of generation. The farthest downstream a pair of trailing vortices has been measured is 13 chords in work published in 1926 by Fage and Simmons.

In view of these problems it is desirable to have a relatively inexpensive facility to produce vortex pairs and allow them to be measured for long distances downstream of their point of generation.

Trailing vortices result from rolling up of a wake behind a lifting surface. For wings with monotonically decreasing lift from the centerline out to the wing tip, there are only two vortices. They contain the vorticity trailing off the lifting surface, and for zero angular acceleration have equal values of circulation, but opposite in sense. In a few wing span lengths, the vortex sheets are well rolled up and the tangential velocity variation is then essentially independent of the method of generation, except for a virtual origin effect. The vortex cores then grow, with vorticity diffusing outward, but the circulation remains constant for contours entirely enclosing either vortex. In still air, according to one hypothesis, the vorticity diffuses to the plane of symmetry, and starts cancelling with vorticity of opposite sense from the opposite vortex. This process continues until, theoretically, all vorticity is completely cancelled. In turbulent air, gross convection of segments of the trailing vortices can occur. It is anticipated that turbulence may decrease the time that the velocities from the vortices are dangerously high. Thus, the critical case of the trailing vortex persistencey problem occurs when the free-stream air turbulence is very low. This present invention deals principally with this case, as its experimental measurement and understanding is essential before any more general turbulent atmosphere case can be treated.

A distinction between the present invention and a helicopter or fan blade should be considered. The blades of the latter devices produce a slipstream motion in which the trailing vortices are only incidental and, in fact, these vortices will dissipate quickly in very turbulent convective flow in which they are entrained. In an embodiment disclosed herein the rotating arm has no lift (as does a helicopter blade) and thus produces no slipstream motion; the arm's purpose is to hold a wing section or vortex generating pairs which produce pairs of essentially symmetric trailing vortices which move together through the quiescent fluid medium and persist for relatively long times.

SUMMARY OF THE INVENTION

The apparatus of the invention basically consists of a rotating arm having no lift mounted on a shaft and on the end of the arm is either mounted a lifting surface or surfaces, such as wings or pairs of vortex generators. A pair of vortex generators produce two vortices of opposite sense of rotation. Vortex pairs generated when the arm is rotating at constant speed will be of uniform strength and they will move radially outward by self-induced motion. The vortex strengths and generator spacings can be adjusted so that when the wing or vortex generators return to any specific point of the circle the newly generated sections of the vortices will have negligible interference from any part of the vortex generated previously. Thus a very long trailing pair is generated which spirals continuously outward from the wing or vortex generators for several or many turns before turbulent break-up or viscous dissipation occurs.

The vortex generatons may consists of any device for creating a swirling flow, such as a series of vanes, a tangential jet inside a shroud, or a small electric motor driving a fan. They would typically consist of ½ to 3-inch diameter tubes. Different screens could be placed over the entrance to the vortex generators to change the drag of the vortices.

Measurements could be made in any of several ways. A stationary platform could be placed in various positions to obtain unsteady measurements of the vortex pair passing by it. A second means would be to move this platform radially outward with the vortex pair induced velocity. This would be equivalent to observing the wake of a passing aircraft at a fixed position. Next, the arm could be extended outward from the vortex generators to obtain steady-state measurements one or more cycles after its generation. A still further means would be to have a rotating platform which could obtain steady-state measurements at any position in the vortex trail without creating the fluid dynamic disturbance upstream of the measurement point as for the previous case.

The apparatus can be used to generate vortices in any fluid. It is not limited to use in air or other gas, but is equally applicable to producing trailing vortices in liquids. Screens could be used around the apparatus to dampen the nature fluid turbulence. A solid circular wall could be placed concentrically around the spinning source of the vortices to simulate the ground so as to deflect the vortices just as they are during aircraft take-off and landing. At any desired position in the trailing vortex swirl the vortices could be removed from the area by one of several means, such as a curved counterrotating deflection plate or suction port. The orientation of the wing axis or the axis between the pair of vortex generators can be arbitrary. If it is vertical, the vortex pair trails off, and spirals outward due to the self-induced velocity as depicted in FIG. 1. In essence, the effect which moves the vortices toward the walls in a wing tunnel and limits their usefulness for vortex investigation is harnessed in the apparatus of the invention to generate long spiral vortices. Since the vortex pair should spiral outward to avoid interference with the arm, the wing should be mounted with an angle of attack so that its lift is directed radially inward. The vortex pair could also be directed at nearly any angle to the arm except radially inward. It is expected, though, that the radially outward case described will be most desirable because of its symmetry of vortex flow.

BRIEF DESCRIPTION OF THE DRAWINGS

FIG. 1 is a perspective view of trailing vortices.

FIG. 2 is a schematic diagram of the trailing vortex apparatus according to one embodiment of the invention.

FIG. 3 is a cross-sectional view of the rotating arm of FIG. 2.

FIG. 4 is a partially cut-away perspective view of one type of vortex generator.

FIG. 5 is a partially cut-away perspective view of a further type of vortex generator.

FIG. 6 is a perspective view of a wing-type vortex generator.

FIG. 7 is a partial plan view of the apparatus of FIG. 2 showing a modified type of turbulence measurement.

FIG. 8 is a partial plan view of the apparatus of FIG. 3 showing a further modified type of turbulence measurement.

FIG. 9 is a partial view of FIG. 2 showing a modified vortex trap.

DESCRIPTION OF THE PREFERRED EMBODIMENTS

Referring now to FIG. 1 of the drawings wherein a schematic perspective view of vortices 16 trailing downward and away from two pairs of vortex generators are shown. A shaft supports a tapered arm 4 that has an array 6 of four vortex generators 8, 10, 12 and 14, mounted at the end thereof. Arm 4 rotates counterclockwise. Vortex generator pairs that are vertical to the plane of arm rotation will generate vortices that spiral outward in the same plane; vortex generator pairs mounted horizontal will produce vortices that spiral downward, perpendicular to the plane of arm rotation. By selecting the angle between the vortex generator pair (such as 8 and 12) and the plane of arm 4 rotation, the direction in which the vortices spiral away can be varied. In the schematic representation of FIG. 1, the generator pairs 8-12, 10-14 are at an angle of roughly 20° from the vertical, thus there is a slight downward component to the spiral direction. As discussed above, the vertical orientation of generator pairs will most likely be the most useful. If desired multiple pairs, as in FIG. 1, may be employed to simulate conditions caused by multiple lifting surfaces or multiple aircraft.

Referring now to FIG. 2 of the drawings wherein an embodiment of the trailing vortex generator is shown. Vortex generator means 6 such as a pair of vortex generators 8 and 12 are mounted vertically at the end of a three-segment airfoil-shaped hollow arm 4 on a support strut 9. As discussed above multiple generator pairs may be used and the generator pairs may be mounted at other angles than the vertical. For the purposes of discussing this embodiment, a vertical orientation providing spiraling vortices directly outward will be assumed. FIG. 3 is a cross-sectional view of arm 4 showing the vortex generator air supply tube 40 and the boundary layer suction flow passageway 38 that acts through a plurality of small holes 41 located near the trailing edge of the airfoil surfaces to provide conventional boundary layer suction action. Arm 4 is attached to a rotatable vertical shaft 2 having counterweights 22 and 24 attached 180° from arm 4. Arm 4 is tapered in segments for greater rigidity and strength and yet have minimum aerodynamic interference with the vortex trails. Shaft 2 may be supported by conventional framework (not shown).

Shaft 2 is rotatably driven by any conventional means. Tube 20 is connected to tube 40 in the arm 4. A source of compressed gas or pressurized liquid (not shown) is connected to the free end of tube 20. Tube 18 is connected to the hollow section 38 of arm 4; the free end of tube 18 is connected to a source of suction sufficient to provide the boundary layer suction.

A circular wall 32, shown in cross-section is provided around the perimeter of the testing area. Screening material 30 that functions as a vortex trap is mounted on the inner perimeter of wall 32. Trap material 30 viewed in cross-section, is a rectangular cage having an aperture or gap in the vicinity of the plane of rotating arm 4. Additional screening material 26 and 28 is mounted above and below rotating arm 4, respectively, to reduce the turbulence and distortion in the flow induced outward toward the vortex generators. The screening 26, 28 and 30 may be supported by any suitable means including wood framing, for example. Screens 26 and 28 are parallel to rotating arm 4 for a length extending to the vortex generators 8 and 12 at its tip; at that point screen 26 rises vertically, perpendicular to arm 4 and screen 28 drops vertically, perpendicular to arm 4.

The trailing vortices 34 (from generator 8) and 36 (from generator 12) propagate outward in a spiral and are seen in cross section in this figure. Upon reaching wall 32 they move along the wall surface as shown and dissipate within screening 30. If desired, to simulate aircraft take off and landing conditions, screening 30 can be eliminated and wall 32 moved in closer to simulate a ground effect.

A sensing device or probe 52 may be held by a standard 51 in the open area between the end of screens 26, 28, and the wall 32. Standard 51 has wheels 53 and a motor 55 driving one set of the wheels by a pulley belt 57 or then suitable means so that the standard may be driven outward so as to remain at a constant location with respect to one of the outward spiraling vortices.

Suitable probes include those that are pressure sensitive, the pressures would be converted to electrical signal, amplified, and recorded on a paper chart, film or the like. Or, hot wire anemometers could be used wherein fluctuations in air flow would produce measurable changes in wire resistance. Such probes and others that would be suitable are well known in the art. Another type of instrumentation usable with the invention is smoke flow visualization with photography. Smoke could be introduced in the vortex generators or immediately downstream of the wing or generators through a probe 52 mounted on one of the support standards 51.

FIG. 7 shows an alternative way of holding a sensing probe 52. An extension 54 is provided from arm 4 beyond the vortex generators and probe 52 is mounted at the end thereof. Thus the probe will rotate in unison with the arm.

FIG. 8 shows a further alternative way of holding probe 52. A second arm 56 is rotated from the axis of shaft 2. The arm may be used to guide a movable standard 58 having an upright portion 50 that is attached to arm 56. As in FIG. 2, probe 52 would be mounted atop upright portion 50 of the probe standard.

Alternately, the moving standard 58 and upright portion 50 could be eliminated. Thus probe 52 would be attached to the end of arm 56 with no further support. Arm 56 could be rotated in synchromism with arm 4 or could be rotated at a different rate in order to vary the effective sampling location.

FIG. 4 shows a vortex generator 8 or 12 of FIG. 2 in greater detail as a hollow open-ended cylinder 11 joined to support strut 9. Tube 40 from arm 4 blows pressurized fluid along the side wall of cylinder 11 to cause a swirling of fluid that interacts with the fluid coming in the front end of the cylinder through screen 43 during rotation to thereby generate a vortex.

FIG. 5 shows an alternative vortex generator, a hollow open-ended cylinder 11 with screen 43 having therein an electric motor 46 driving a shaft 44 and propellor blade 42. The rotating propellor blade acts similarly to the jet of pressurized fluid in the embodiment of FIG. 4 to generate a vortex as the cylinder is moved through the fluid.

FIG. 6 shows a curved wing section 48 mounted at the end of arm 4. A pair of trailing vortices will be generated as the wing is moved through the fluid near the extremities of the trailing edge of the wing. The wing is curved because it is desired to produce a vortex pair close together; yet the strength of a vortex pair depends on the wing section length. Thus folding over the wing as shown in FIG. 6 permits the generation of a strong closely located vortex pair.

In FIG. 9, an alternate vortex trap is shown. The outward spiraling vortices 34 and 36 (see in cross-section) generated by vortex generators 8 and 12, respectively, enter the opening in screening 30, turn and travel along the wall 32. Apertures or slits 35 are provided in wall 32 for the vortices to propagate outward so as to leave the fluid enclosed by the circular enclosing wall 32. The structural details of this alternative vortex trap form no part of the invention; conventional techniques in construction may be used.

Further Considerations of the Invention

The induced velocity of a pair of concentrated retilinear vortices is given by $$V = \Gamma/2\pi a$$

where $V$ is velocity, $\Gamma$, the lifting surface circulation, and $a$, the distance between the vortices. This equation initially gives a good approximation for the velocity of the vortex pair generated by this facility. Having adequate spacing between vortex pairs is necessary for minimum interference. For this apparatus, the spacing between vortex pairs, $d$, is determined by $$d/a = \Gamma D/2a^2 U$$

where $D$ is twice the radius of the arm 4, and $U$ is its tip velocity.

The invention allows trailing vortices of extraordinary length to be obtained. An equivalent wind tunnel for vortex testing would be much more expensive. This invention with a 7-foot arm would produce in 1.6 turns the same length vortex that could be generated in a 40-by-80-foot wind tunnel (the largest in the world). To study the aircraft trailing vortex problem a 27 ft. diameter circular wall (32) around a 7 ft radius arm (4) for example, operation with a tip speed of 300 ft/sec could generate a spiral vortex that 2½ revolutions behind the vortex generators was a small model of the trailing vortices 20 miles behind the Boeing 747 airplane. The most important dimensionless parameter (velocity × distance behind the airplane/airplane circulation) can be accurately scaled.

Several questions bear discussion in connection with the vortex motion. Arc segments in a newly created vortex pair expand in length as they move radially outward. For the extreme case of zero draft of the trailing vortex generators, so that there is no net axial flow in the vortices, vortex lines are being stretched as the vortices move nearly radially outward, but the circulation about each vortex remains unaffected until physical contact between the vortices occurs. The stretching process will tend to reduce the core diameter, but this will be a small effect compared to the outward diffusion of vorticity. For the normal case, where there is an axial velocity defect, fluid moves along the vortex back toward the generators and partially nullifies the stretching process.

Another question concerns the interaction of the vortex pairs. Examining a radial cross section of the flow out board of the vortex generator, there is a finite row of vortex pairs. The induced velocity of symmetric vortex pairs in infinite rows of rectilinear vortices is the same as for an isolated pair. An indefinite row of symmetrically arranged vortex pairs is unstable, but the vortices will maintain their relative positions unless disturbed and then the disturbance propagates rather slowly if the radial spacing is large compared to the lateral spacing. Also, at the beginning of the vortex pair row, the spacing between the vortices of the first ring will decrease because of end effects until they become the second ring. Thereafter their spacing remains essentially constant. However, for a spacing ratio $d/a = 4$, the velocity with which they approach each other is less than 3 percent of the velocity of the isolated vortex pair. Therefore, the decrease in the spacing of the vortex pair between the first and second rings is very small. Also, the vortex core size is always growing, and eventually the vorticity of the two vortices starts cancelling. This also affects the propagation velocity.

The limit of how long the coherent flow structure of the trailing vortex pair can be studied will be determined by the vortex breakup. This effect is directly related to the free-stream turbulence level and any unsteadiness in the vortex generation. Starting this test in very still room air, the turbulence level will initially be extremely low. It will probably rise if the turbulent wake from the rotating arm is allowed to develop. This wake is essentially equivalent to the resulting disturbance from the strut holding a wing in a wind tunnel. While the arm is much longer than a strut, only the outer radius section effectively disturbs the flow and the effect can be reduced by shielding. It is expected that boundary-layer suction can reduce this effect to a minimum.

From wind-tunnel design it is well known that the most effective screen to use to reduce flow disturbances is that with a drag coefficient of 2. A screen with a greater value will actually invert flow disturbances. Also, the structure should be upstream of the screens and contact with the screens kept to a minimum of surface area. Two counterweights 22 and 24 are shown outside of the screened-in region. They should also be designed for minimum drag.

Smoke flow visualization will be a convenient tool for visualizing the vortices to see how they diffuse and eventually break up. Also, three-dimensional flow aspects can be visualized. Here, as in the real airplane case, the flow velocities with respect to a ground observer return to zero, unlike those in a wind tunnel, which return to the free-stream value. Hot wire equipment is the most suitable method for measuring the turbulence and low velocities in the facility.

Instrumentation can be mounted in one or more of the several methods discussed hereinbefore. The strut extension has several disadvantages: additional interference, and measurements can only be made after each whole turn, with the need for slip rings to obtain the data. For mean velocities, a stationary stand probably will be satisfactory since velocity averages can be obtained over many cycles of the vortices sweeping across the instrumentation. Obtaining the turbulent velocity information may possibly require a moving platform because of the low frequencies involved.

It will be apparent to those of ordinary skill in the art that the invention as described herein is susceptable to many modifications without departing from the spirit and scope of the invention. For example, the invention is not limited to testing in the air; the invention could be practiced in other fluids. The invention is therefore to be limited only by the scope of the appended claims.

I claim:

1. Apparatus for generating trailing vortex pairs in a fluid medium comprising:
    support means defining an axis in said fluid medium,
    vortex pair generating means rotatably mounted about said axis for generating trailing vortices moving in a generally spiral path substantially radially outward from said axis in said medium, and
    means for measuring fluid disturbances resulting from said trailing vortices in said fluid medium.

2. Apparatus for generating trailing vortex pairs in a quiescent fluid medium, comprising:
    support means defining an axis in said fluid medium,
    vortex air generating means rotatably mounted about said axis for generating trailing vortices moving in a generally spiral path away from said axis in said medium,
    means independent of the vortex pair generating means for rotating said generating means about said axis, and
    means for measuring fluid disturbances resulting from said trailing vortices in said medium.

3. Apparatus for generating trailing vortex pairs and for measuring the resulting fluid disturbances in a fluid medium comprising:
    support means defining an axis in said fluid medium,
    vortex pair generating means rotatably mounted about said axis for generating trailing vortices moving in a generally spiral path away from said axis in said medium, and
    measuring means for measuring said fluid disturbances in said medium.

4. Apparatus according to claim 3 further comprising means for trapping trailing vortices that have spiraled a predetermined distance away from said axis.

5. Apparatus according to claim 4 further comprising a housing surrounding said axis and adapted to contain a body of said fluid medium.

6. Apparatus according to claim 5 wherein said housing is of a generally circular cylindrical form, said axis centered therein and said trapping means is adjacent and within said housing.

7. Apparatus according to claim 3 wherein said support means and vortex generating means comprises:
    a support structure along said axis,
    an arm perpendicular to said axis and attached to said support structure,
    a plurality of vortex generators attached to said arm and spaced from said support, and
    means for rotating said arm about said axis.

8. Apparatus according to claim 3 wherein said measuring means comprises:
    sensing probe means, and
    means for holding said probe means.

9. Apparatus according to claim 8 wherein said means for holding comprises an extension arm attached to said horizontal arm.

10. Apparatus according to claim 9 wherein said extension arm extends radially outward from said axis.

11. Apparatus according to claim 9 wherein said means for holding comprises:
    a second perpendicular arm attached to said support and rotating at a predetermined angular velocity with respect to said first recited perpendicular arm, said second arm having a greater length than said first recited perpendicular arm.

12. Apparatus according to claim 11 wherein said second arm rotates at the same angular velocity as said first recited arm and said arms are spaced by a predetermined angle.

13. Apparatus according to claim 8 wherein said means for holding comprises a support structure movable radailly from said axis.

14. A method of generating and measuring fluid disturbances in a fluid medium comprising:
    rotating a plurality of vortex generators in a path about an axis within said fluid medium to generate trailing vortices moving in a generally spiral path away from said axis, and
    measuring said fluid disturbances in said medium.

15. The method of claim 14 further comprising trapping vortices that have spiraled a predetermined distance away from said circular path.

* * * * *